(12) United States Patent
Renshaw

(10) Patent No.: US 6,182,528 B1
(45) Date of Patent: *Feb. 6, 2001

(54) MULTILAYER HANDLEBAR

(75) Inventor: Andrew Charles Renshaw, Macclesfield (GB)

(73) Assignee: Renthal Limited, Cheshire (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/941,761

(22) Filed: Sep. 30, 1997

(30) Foreign Application Priority Data

Jan. 18, 1997 (GB) .................................................. 9701027

(51) Int. Cl.[7] .................................................. B62K 21/12
(52) U.S. Cl. ......................................... 74/551.1; 74/551.4
(58) Field of Search ............................... 74/551.1, 551.3, 74/551.9, 551.5, 551.7, 551.8, 551.4

(56) References Cited

U.S. PATENT DOCUMENTS

| 332,092 | * | 12/1885 | Latta | 74/551.4 |
| 4,707,389 | * | 11/1987 | Ward | 428/36 |
| 4,939,950 | * | 7/1990 | Girvin | 74/551.2 |
| 5,117,708 | * | 6/1992 | Boyer | 74/551.1 |
| 5,119,690 | * | 6/1992 | Shu | 74/551.1 |
| 5,199,322 |  | 4/1993 | Wu . |  |
| 5,832,785 |  | 11/1998 | Costahaude et al. . |  |

FOREIGN PATENT DOCUMENTS

| 2915437 | * | 11/1980 | (DE) | 74/551.1 |
| 10282 | * | 10/1894 | (GB) | 74/551.1 |
| 22414 | * | 12/1897 | (GB) | 74/551.1 |
| 264754 | * | 1/1927 | (GB) | 74/551.2 |
| 402573 |  | 12/1933 | (GB) . |  |
| 442238 | * | 2/1936 | (GB) | 74/551.1 X |

* cited by examiner

Primary Examiner—Rodney H. Bonck
Assistant Examiner—Ha Ho
(74) Attorney, Agent, or Firm—Oliff & Berridge, PLC

(57) ABSTRACT

A handlebar for a motorcycle or similar vehicle comprises at least one outer tubular sleeve surrounding an inner tubular member which is of constant diameter and constant wall thickness throughout. Both the outer sleeve and the inner member have a central region, flanked by symmetrical oblique regions, leading to respective handgrip regions. The multi-layer construction of the handlebar limits crack propagation and allows use of two or more different materials. With a two-layer construction, the outer tubular sleeve is preferably of constant wall thickness in its central region and of constant, yet smaller wall thickness in the handgrip regions, with a reduction in wall thickness taking place over a very short distance in the intermediate oblique regions. With a three-layer construction, the outer layers may each be of constant wall thickness, the outermost layer(s) not extending to the ends of the adjacent inner layer.

12 Claims, 1 Drawing Sheet

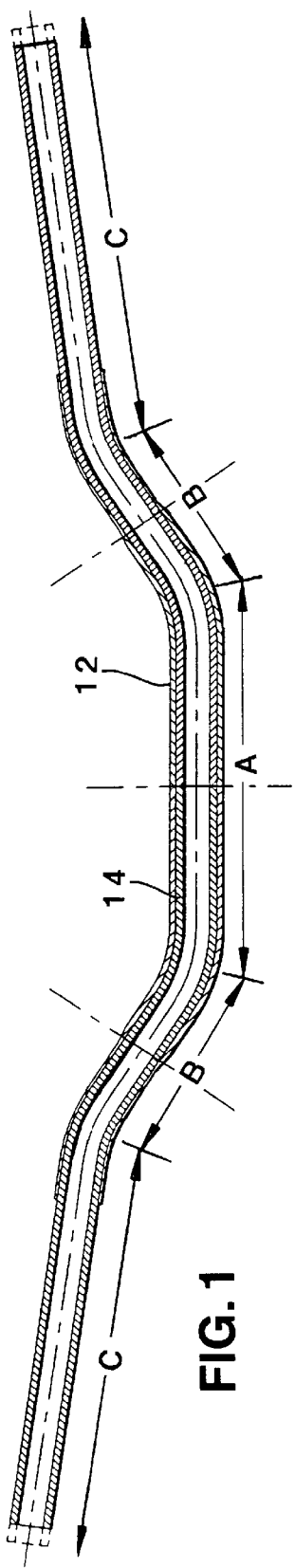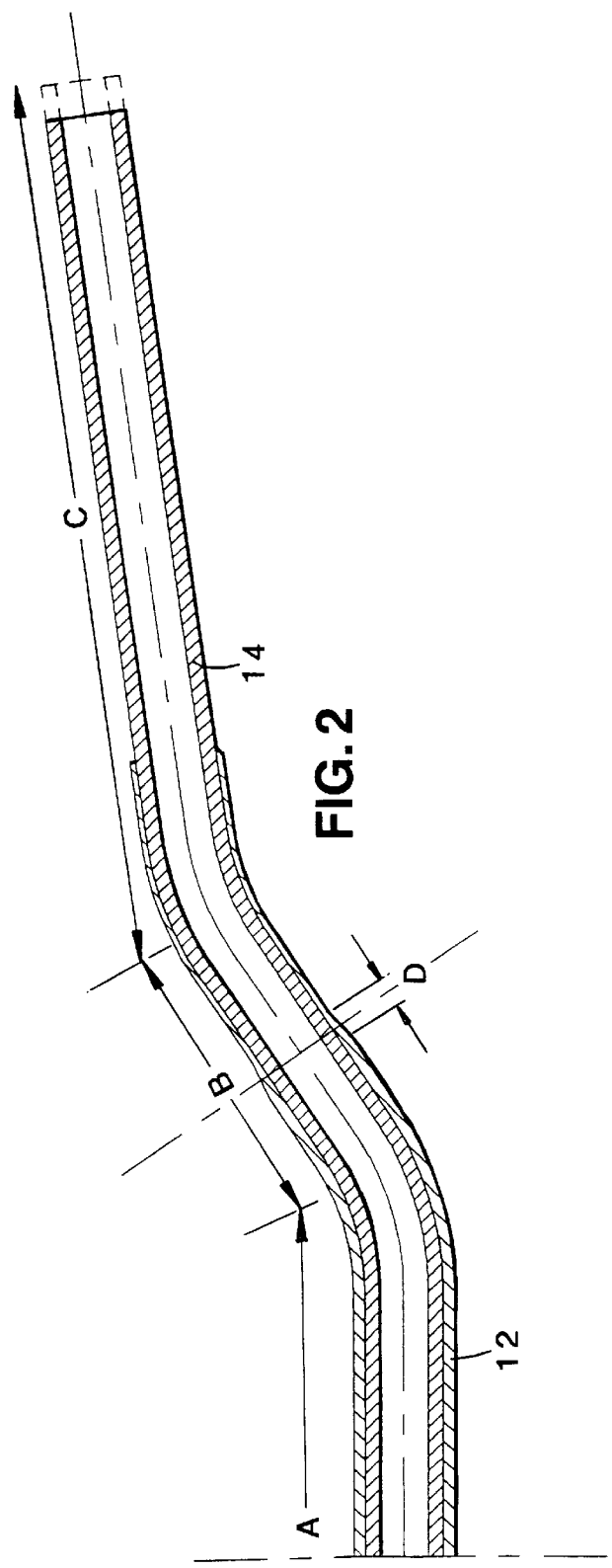

MULTILAYER HANDLEBAR

A. TECHNICAL FIELD

This invention concerns an improved construction of handlebar for a bicycle, motorcycle or other two wheeled power vehicle or all terrain vehicle (including watercraft and snowmobiles).

B. DESCRIPTION OF RELATED ART

Hitherto handlebars of motorcycles and cycles have comprised a single length of tube appropriately bent to provide a central region and respective handgrip regions, the former being clamped at one or two positions to form a connection to the main cycle frame via an intermediate top yoke or stem. For added strength it has been conventional to provide a brace (sometimes called a crossbrace) spanning the central region of the tube. An alternative to this has been the provision of a tubular handlebar having a greater external diameter in its central region, said diameter reducing to the handgrip portions of the tubing.

U.S. Pat. No. 5,257,552 discloses an integrally formed unitary hollow tubular handlebar of the latter type wherein the wall thickness is greatest and constant in the central region, least and constant in the handgrip portions, and gradually tapering from the greatest to least thickness in respective bent portions which extend between and connect the central region and the respective handgrip portions.

SUMMARY OF THE INVENTION

An object of the present invention is to provide an improved construction of handlebar which would have greater resistance to impact damage or fatigue failure than any known style of motorcycle or cycle handlebar, and which would not necessarily need a brace or crossbrace, although the latter could be provided for even greater strength.

The present invention proposes a unitary handlebar comprising an inner tubular member of constant diameter and constant wall thickness and an outer tubular sleeve surrounding the inner tubular member, both the inner tubular member and the outer tubular sleeve, having a central region, bends at each end of the central region leading to symmetrical oblique regions, and further bends at the distal ends of the oblique regions leading to respective handgrip regions, in which respect the respective handgrip regions of said inner tubular member extend beyond the handgrip regions of said outer tubular sleeve.

The use of two or more layers of material to provide the tubular body of the handlebar has numerous advantages.

Firstly, it limits crack propagation upon severe impact, since a crack in one of the layers will not spread into the other layer or layers. This is important in preventing complete failure of the handlebar in the event of a crash— crashes being frequent in the sport of motocross and other activities involving off-road motorcycles and other all terrain powered vehicles. The use of two or more layers of material also helps to stop cracks propagating because of metal fatigue through long term use.

Secondly, it allows use of two or more different materials so that, for example, a stronger, but more notch sensitive material can be used for the inner member or members, and a more ductile but less notch sensitive and less brittle material with better fatigue resistant properties can be used for the outer sleeve or sleeves. This should be particularly useful in minimizing stress and impact damage at the locations where the handlebar is clamped to the top yoke or stem connected to the main cycle frame. Perhaps it may be suitable, in this respect, to use two or more different grades of aluminium, but numerous other combinations of metals or other materials would be possible. The materials of both the inner member and the outer sleeve or sleeves would, of course, have to be substantially rigid.

BRIEF DESCRIPTION OF DRAWINGS

The invention will be described further, by way of example, with reference to the accompanying drawing wherein:

FIG. 1 is a cross section of a preferred embodiment of the handlebar of the invention; and FIG. 2 is an enlarged view of the right hand side of the embodiment of FIG. 1.

DETAILED DESCRIPTION OF PREFERRED EMBODIMENT

Referring to the FIGS. 1 and 2, a preferred handlebar comprises an outer tubular sleeve (12) which is a snug fit around an inner tubular member (14). Both the sleeve (12) and the member (14) are formed of metal.

The handlebar is symmetrical and has a central region A which is straight. At each end of the central region A there is a respective bend leading to an oblique region B. The distal end of each oblique region B (i.e. the end remote from the central region A) leads, via another bend, to a respective handgrip region C. The lengths of these regions and their relative angles may vary depending on the type of cycle or motorcycle or other vehicle for which they are intended.

Throughout its entirety the inner tubular member (14) has constant diameter and constant wall thickness. By way of example, the outer diameter may be 0.875 inches (22.23 mm) and the wall thickness 0.160 inches (4.06 mm).

The outer sleeve (12) is of a constant wall thickness in the central region A, and of a constant wall thickness in the handgrip regions C. However, its thickness in region A is greater than its thickness in region C. For example in region A its thickness may be 0.125 inches (3.18 mm). while in region C its thickness may be 0.0625 inches (1.59 mm). In certain short sections D of the respective oblique or bent regions B, the thickness of the outer sleeve (12) reduces from that in the central region A to that in the handgrip region C. The section D may be between 10 and 30 mm long, preferably 15 mm, so it is a steep, almost stepped reduction in diameter in this short section. In other embodiments it could be a more gradual reduction or a stepped reduction in diameter.

It will be noticed that the inner member (14) in the handgrip regions C extends a considerable distance beyond the outer sleeve (12). This may vary in other embodiments.

In manufacturing the handlebar the member (14) and the sleeve (12) will be formed separately of metal tubes, probably of different types of metal. The reduction in thickness of the sleeve (12) will be brought about prior to the insertion of the member (14). In this respect, the member (14) need not be a very tight fit in the sleeve (12). Thereafter they can be shaped together by bending in conventional manner.

The invention is not limited to the details of the above described embodiment. Many variations are possible. In particular, the handlebar may be formed of more than two layers of material. In this respect, in cases where three layers of material are used, there may well be no requirement for reduction in thickness of the outer layer or layers. In other words, each of the layers may be of a constant thickness, but the outer layers may be successively shorter than the inner layer.

What is claimed is:

1. A unitary handlebar comprising an inner tubular metal member and an outer tubular metal sleeve surrounding the inner tubular member, both the inner tubular member and the outer tubular sleeve having a central region, bends at each end of the central region leading to symmetrical oblique regions, and further bends at the distal ends of the oblique regions leading to respective handgrip regions, the respective handgrip regions of the inner tubular member extending beyond the handgrip regions of the outer tubular sleeve.

2. A handlebar as in claim 1 wherein there is a stepped reduction in the wall thickness of said outer tubular sleeve in its respective oblique regions.

3. A handlebar as in claim 1 wherein a reduction in the wall thickness of said outer tubular sleeve takes place in the respective oblique regions over a distance of between 10 and 30 mm.

4. A handlebar as in claim 1 wherein said outer tubular sleeve is positioned symmetrically upon said inner tubular member.

5. The handlebar of claim 1, wherein the inner tubular metal member has a constant diameter and constant wall thickness.

6. The handlebar of claim 1, wherein the outer tubular sleeve has a constant wall thickness in its central region and a constant smaller wall thickness in its respective handgrip regions.

7. A handlebar comprising:

a first elongate tube member having a central section and first and second end sections, each of the end sections having a proximal bend leading from the central section, a middle portion leading from the proximal bend, a distal bend leading from the middle portion and a distal end leading from the distal bend, and a second member including a sleeve fitting closely around the first member and of a similar configuration thereto, but only extending from the distal bend of the first end section to the distal bend of the second end section of the first member, the second member having a uniform inner diameter throughout its length, but having a larger outer diameter overlying the central section and proximal bends of the first member than an outer diameter overlying the respective distal bends of the first member.

8. A handlebar as in claim 7 wherein the second member has a stepped reduction in its outer diameter at a location overlying each of the middle portions of the first member.

9. A handlebar as in claim 7 wherein the second member has a tapered reduction in its outer diameter over a distance of between 10 and 30 mm overlying each of the middle portions of the first member.

10. The handlebar of claim 7, wherein the first member has constant inner and outer diameters throughout its length.

11. A handlebar comprising:

a first elongate tube member having a central section and first and second end sections, each of the end sections having a proximal bend leading from the central section, a middle portion leading from the proximal bend, a distal bend leading from the middle portion and a distal end leading from the distal bend, and a second member including a sleeve closely overlying the first member and of a similar configuration thereto, but only extending from the distal bend of the first end section to the distal bend of the second end section of the first member.

12. The handlebar of claim 11, wherein the first member has constant inner and outer diameters throughout its length.

* * * * *